US012725507B2

(12) United States Patent
Kashimura et al.

(10) Patent No.: US 12,725,507 B2
(45) Date of Patent: Sep. 1, 2026

(54) NOTIFICATION DEVICE AND STORAGE MEDIUM

(71) Applicant: TOYOTA JIDOSHA KABUSHIKI KAISHA, Toyota (JP)

(72) Inventors: Takashi Kashimura, Nagoya (JP); Takahiro Kato, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/920,996

(22) Filed: Oct. 21, 2024

(65) Prior Publication Data

US 2025/0174108 A1 May 29, 2025

(30) Foreign Application Priority Data

Nov. 28, 2023 (JP) ................................ 2023-200669

(51) Int. Cl.
*G08B 21/24* (2006.01)
*G08B 21/02* (2006.01)
*G08B 25/00* (2006.01)

(52) U.S. Cl.
CPC ......... *G08B 21/24* (2013.01); *G08B 21/0208* (2013.01); *G08B 25/008* (2013.01)

(58) Field of Classification Search
CPC ............ A61B 5/681; A61B 2562/0219; A61B 2505/01; A61B 2560/0214; A61B 2560/0223; A61B 2560/0468; A61B 5/0006; A61B 5/0008; A61B 5/002; A61B 5/0022; A61B 5/0205; A61B 5/02055; A61B 5/02438; A61B 5/026; A61B 5/0295; A61B 5/0537; A61B 5/1038; A61B 5/11; A61B 5/1112; A61B 5/1113; A61B 5/1114; A61B 5/1116; A61B 5/1117; A61B 5/1118; A61B 5/112; A61B 5/1124; A61B 5/1128; A61B 5/1176; A61B 5/14532; A61B 5/224; A61B 5/30; A61B 5/318; A61B 5/33; A61B 5/369; A61B 5/389; A61B 5/4023; A61B 5/4076; A61B 5/411;
(Continued)

(56) References Cited

U.S. PATENT DOCUMENTS

2007/0229517 A1* 10/2007 May ..................... G06Q 10/109
345/501
2008/0068157 A1 3/2008 Ikemori et al.
(Continued)

FOREIGN PATENT DOCUMENTS

| | | | |
|---|---|---|---|
| JP | 2008-070981 | A | 3/2008 |
| JP | 2021-072040 | A | 5/2021 |
| JP | 7344618 | B1 | 9/2023 |

*Primary Examiner* — Daniel Previl
(74) *Attorney, Agent, or Firm* — SoraIP, Inc.

(57) ABSTRACT

A notification device carried by a user includes a control unit capable of switching between the first mode and the second mode. The first mode is a mode in which the position information indicating the position of the notification device is transmitted to the predetermined external device in the first cycle, and the reminding notification is transmitted when the transmission condition of the reminding notification that prompts the user to perform the safety action is satisfied. The second mode is a mode in which position data is transmitted to a predetermined external device in a second cycle longer than the first cycle, and transmission of a reminder notification is made OFF.

6 Claims, 5 Drawing Sheets

(58) Field of Classification Search

CPC ... A61B 5/4519; A61B 5/4528; A61B 5/4803; A61B 5/4806; A61B 5/6816; A61B 5/6822; A61B 5/6826; A61B 5/6838; A61B 5/6898; A61B 5/7203; A61B 5/7214; A61B 5/7225; A61B 5/726; A61B 5/7267; A61B 5/7271; A61B 5/743; A61B 5/7435; A61B 5/7455; A61B 5/7465; A61B 5/7475; A61B 8/0808; A61B 8/56; A61B 8/565; A61B 2560/0276; A61B 5/0531; A61B 5/6803; A61B 2562/0204; A61B 2562/0215; A61B 2562/0217; A61B 2562/043; A61B 5/291; A61B 5/296; A61B 5/398; A61B 5/4836; H04M 2250/12; H04M 1/72412; H04M 1/72454; H04M 1/05; H04M 1/724; H04M 1/72436; H04M 1/72457; H04M 1/72484; H04M 3/436; H04M 1/724097; H04M 1/72421; H04M 11/04; H04M 2250/10; G02B 27/0093; G02B 27/017; G02B 2027/014; G02B 2027/0178; G02B 2027/0187; G02B 27/0172; G02B 27/02; G04B 37/1486; G04B 47/063; H04L 12/54; H04L 67/52; H04L 63/0861; H04L 67/10; H04L 67/306; H04L 65/403; G01H 3/125; A45C 13/001; A45C 13/02; A45C 15/00; A45C 5/04; A45F 2005/008; A45F 5/00; A45F 5/02; A61N 1/0456; A61N 1/0476; A61N 1/36025; A61N 1/04; A61N 1/0484; A61N 1/0492; A61N 1/3603; A61N 1/36031; B64U 2201/10; B64U 2201/20; B64U 80/60; F41B 11/723; F41B 11/724; F41B 1/00; F41B 3/00; F41B 4/00; F41B 5/00; F41B 6/00; F41B 7/00; F41B 9/00; F41B 11/00; F41B 13/00; F41B 15/00; B21B 33/00; B21B 38/00; B21B 1/00; B21B 3/00; B21B 5/00; B21B 9/00; B21B 11/00; B21B 13/00; B21B 17/00; B21B 15/00; B21B 19/00; B21B 21/00; B21B 25/00; B21B 23/00; B21B 27/00; B21B 28/00; B21B 29/00; B21B 31/00; B21B 35/00; B21B 37/00; B21B 41/00; B21B 39/00; B21B 43/00; B21B 45/00; B21B 47/00; B21B 99/00; B21B 2201/00; B21B 2203/00; B21B 2205/00; B21B 2261/00; B21B 2263/00; B21B 2265/00; B21B 2267/00; B21B 2269/00; B21B 2271/00; B21B 2273/00; B21B 2275/00; B26D 5/007; F04B 31/00; F04B 35/01; F04B 39/0005; F04B 39/10; F16P 3/144; G01S 11/12; G01S 17/46; G01S 17/48; G01S 17/89; G01V 8/20; G05B 19/406; G05B 2219/40202; G05B 9/02; G06T 11/60; G06T 2207/20084; G06T 2207/30204; G06T 2207/30261; G06T 7/521; G06T 7/593; G06T 7/70; G06V 10/751; G06V 20/10; H04N 23/45; H04N 23/56; E05F 15/40; E05F 15/70; E05F 15/72; E05F 15/73; E05Y 2201/422; E05Y 2900/132; E05Y 2201/00; E05Y 2600/00; E05Y 2400/00; E05Y 2800/00; E05Y 2900/00; E05Y 2999/00; G05D 7/03; G05D 1/00; G05D 3/00; G05D 2109/00; G05D 2107/00; G05D 2105/00; G05D 2103/00; G05D 2111/00; Y10S 239/15; Y10T 137/1987; Y10T 137/2521; Y10T 137/5762; Y10T 137/6969; Y10T 137/7039; Y10T 137/7297; Y10T 137/7303; Y10T 137/7316; Y10T 137/7342; Y10T 137/7726; Y10T 137/7737; Y10T 137/8622; Y10T 74/11; Y10T 24/00; Y10T 29/00; Y10T 70/00; Y10T 74/00; Y10T 82/00; Y10T 83/00; Y10T 117/00; Y10T 152/00; Y10T 156/00

USPC ....... 340/457, 459, 463, 454, 473, 488, 520, 340/532, 538.11, 539.22, 539.13–539.15

See application file for complete search history.

(56) References Cited

U.S. PATENT DOCUMENTS

| | | | | |
|---|---|---|---|---|
| 2011/0319128 | A1* | 12/2011 | Miwa | H04B 1/46 455/550.1 |
| 2013/0314226 | A1* | 11/2013 | Zhang | F24C 7/082 340/539.11 |
| 2015/0015459 | A1* | 1/2015 | Cho | H04M 1/724 345/8 |
| 2017/0006659 | A1* | 1/2017 | Jha | H04W 28/082 |
| 2017/0111500 | A1* | 4/2017 | Sougen | H04M 3/436 |
| 2021/0099570 | A1* | 4/2021 | Schenone | G06F 1/1615 |
| 2023/0308747 | A1* | 9/2023 | Min | H04N 23/651 |
| 2024/0428671 | A1 | 12/2024 | Yamamoto | |

* cited by examiner

FIG. 3

| | DATA COMMUNICATION | TO SEND LOCATION INFORMATION | REMIND CALCULATION | VOICE CALL | OPERATION FOR WALKING DETECTION | CALL |
|---|---|---|---|---|---|---|
| FIRST MODE | ON | ON (FIRST CYCLE) | ON | ON | ON | ON |
| SECOND MODE | ON | ON (SECOND CYCLE) | OFF | OFF | ON | OFF |
| THIRD MODE | OFF | OFF | OFF | OFF | OFF | OFF |

NOTIFICATION DEVICE AND STORAGE MEDIUM

CROSS-REFERENCE TO RELATED APPLICATION

This application claims priority to Japanese Patent Application No. 2023-200669 filed on Nov. 28, 2023, incorporated herein by reference in its entirety.

BACKGROUND

1. Technical Field

The present disclosure relates to a technique of transmitting a notification that prompts a user to take a safety action.

2. Description of Related Art

Japanese Unexamined Patent Application Publication No. 2021-072040 (JP 2021-072040 A) discloses a technology related to power control of a portable terminal carried by a carrying person. In the technology disclosed in JP 2021-072040 A, when a first condition is met when the current position is a set position set beforehand, the portable terminal is controlled into a power saving state. Further, when a second condition is met when the current position is a position other than the set position, the portable terminal is controlled into the power saving state.

SUMMARY

An object of the present disclosure is to suppress power consumption in a notification device while ensuring emission of a necessary reminder notification to a user while suitably transmitting position information to an external device.

A first aspect of the present disclosure provides a notification device that is carried by a user, including a control unit capable of switching between a first mode and a second mode, in which: the first mode is a mode in which position information that indicates a position of the notification device is transmitted to a predetermined external device in a first cycle, and a reminding notification that prompts the user to take a safety action is emitted when an emission condition for the reminding notification is met; and the second mode is a mode in which the position information is transmitted to the predetermined external device in a second cycle longer than the first cycle, and emission of the reminder notification is turned off.

A second aspect of the present disclosure provides a storage medium storing a program that controls a terminal that enables a call with the notification device according to the first aspect, in which:

the user is a first user; and when an operation to make a call with the notification device is performed on the terminal by a second user different from the first user while the second mode is executed in the notification device, the terminal is caused to display that a call with the notification device is currently disabled.

According to the present disclosure, it is possible to suppress power consumption in a notification device while ensuring emission of a necessary reminder notification to a user while suitably transmitting position information to an external device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating a state of each function of the notification device in each control mode;

DETAILED DESCRIPTION OF EMBODIMENTS

Figure 1:
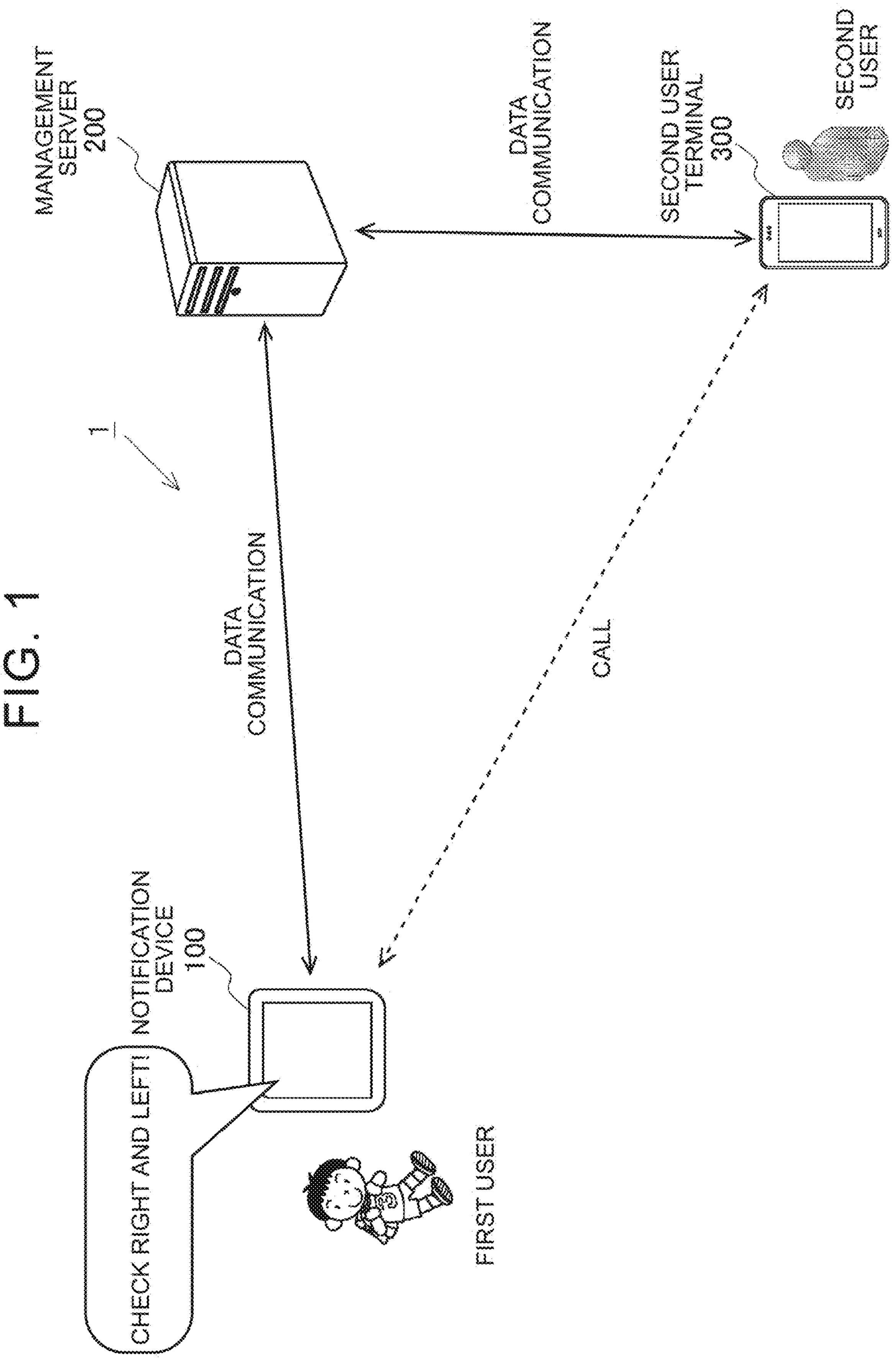
FIG. 1 is a schematic diagram of a system according to an embodiment.

The notification device according to the present disclosure is a device carried by a user. The notification device has a function of transmitting a reminder notification to a user who possesses the notification device. Here, the reminding notification is a notification that prompts the user to take a safe action. The safety action is an action for securing the safety of the user himself/herself. The safety action prompted to the user by the reminding notification may be changed according to, for example, the position of the user.

Furthermore, the notification device has a function of transmitting position information indicating the position of the notification device, that is, the position of the user carrying the notification device (hereinafter, also referred to as "first user"), to a predetermined external device. As a result, a user different from the first user (hereinafter, also referred to as a "second user") can receive the position information of the first user to its own terminal via a predetermined external device. As a result, the second user can grasp the position of the first user.

The notification device includes a control unit. The control unit can switch between the first mode and the second mode as the control mode of the notification device. Here, the first mode is a mode in which the position information is transmitted to the predetermined external device in the first cycle, and the remind notification is transmitted when the transmission condition of the remind notification is satisfied. The origination condition is, for example, that the first user is in a place where the safety action is to be taken. In addition, the transmission condition may be that the first user performs an action to prompt the first user to perform the safety action. On the other hand, the second mode is a mode in which position data is transmitted to a predetermined external device in a second cycle longer than the first cycle, and transmission of a reminder notification is made OFF.

In the notification device according to the present disclosure, the first mode is executed by the control unit. Thus, the second user can grasp the position of the first user in the first cycle, and can send a reminder notification when the safety action is to be urged to the first user. Further, when it is not necessary to prompt the first user to perform the safety action, the notification device can cause the control unit to execute the second mode. In a situation where it is not necessary to prompt the first user to perform the safety action, it is considered that the necessity for the second user to grasp the position of the first user is also reduced.

Therefore, in the second mode, the transmission period of the position information is made longer than that in the first mode. Further, in the second mode, the reminding notification is not transmitted. Therefore, by executing the second mode by the control unit, it is possible to suppress power consumption in the notification device.

Therefore, according to the notification device of the present disclosure, it is possible to suppress power consumption while suitably transmitting position information to an external device and securing transmission of a necessary reminder notification to a user.

Hereinafter, an embodiment of the present disclosure will be described with reference to the drawings. The dimensions, materials, shapes, relative arrangements, and the like of the components described in the present embodiment are not intended to limit the technical scope of the present disclosure only thereto unless otherwise specified.

Embodiment

System Overview

FIG. 1 is a schematic diagram of a system according to the present embodiment. The system 1 is a system for remotely watching a first user. Here, the first user may be, for example, a child. The system 1 includes a notification device 100, a management server 200, and a second user terminal 300.

The notification device 100 is a device possessed by the first user. The notification device 100 may be, for example, a wearable device attachable to a first user's clothing, a hat, or a bag. The notification device 100 has a function of transmitting a reminder notification. The reminder notification is a notification for prompting the first user to perform a safety action. For example, the notification device 100 "confirm right and left!" A voice such as a voice may be sent as a reminder notification. The notification device 100 has a function of performing data communication with the management server 200. Then, the notification device 100 transmits the position information indicating the position of the notification device 100, that is, the position of the first user carrying the notification device 100, to the management server 200.

The second user terminal 300 is a terminal related to the second user. The second user is a user who watches the first user. The second user may be, for example, the parent of the first user. In the system 1, the second user terminal 300 corresponding to the notification device 100 is set in advance. The second user terminal 300 may be, for example, a smartphone, a tablet computer, a mobile computer, or a wearable computer. The second user terminal 300 has a function of performing data communication with the management server 200. Then, the second user terminal 300 receives the location information of the first user received by the management server 200 from the notification device 100 from the management server 200. Thus, the second user can grasp the position of the first user.

The second user terminal 300 has a function of transmitting data for performing various settings in the notification device 100 to the notification device 100 via the management server 200. The notification device 100, the second user terminal 300, and the management server 200 are connected to each other via a network. Here, as the network, for example, a mobile communication network using a predetermined standard such as long term evolution (LTE) or 5G may be employed.

Furthermore, the notification device 100 and the second user terminal 300 have a call function. Therefore, the first user and the second user can perform voice communication with each other by the communication function of the notification device 100 and the second user terminal 300.

Configuration of Notification Device

Figure 2:
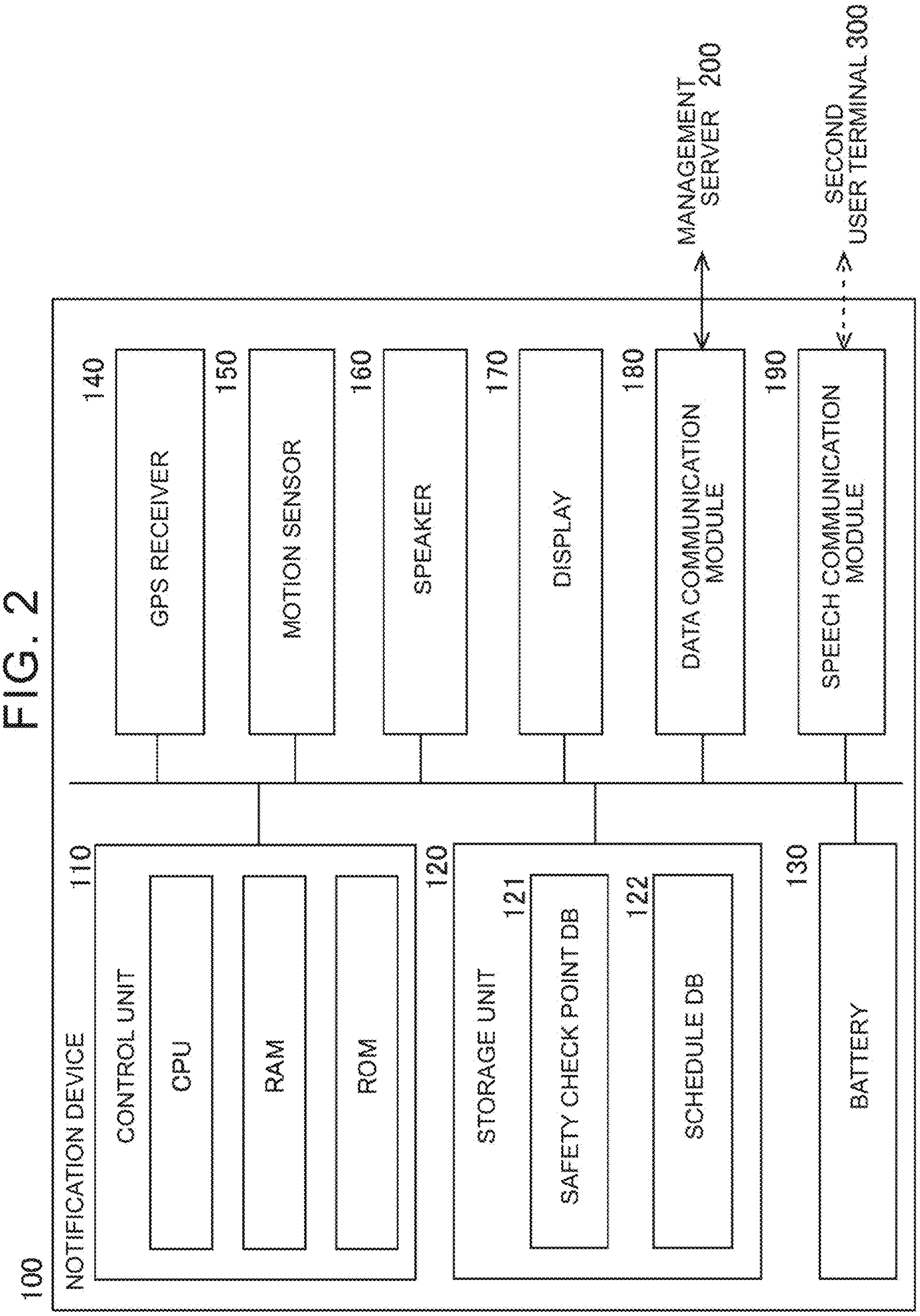
FIG. 2 is a block diagram schematically illustrating a configuration of a notification device.

Next, the configuration of the notification device 100 will be described. FIG. 2 is a block diagram schematically illustrating a configuration of the notification device 100. The notification device 100 includes a control unit 110, a storage unit 120, a battery 130, a GPS receiver 140, a motion sensor 150, a speaker 160, a display 170, a data communication module 180, and a call module 190.

The control unit 110 has a function of performing arithmetic processing for controlling the notification device 100. The control unit 110 includes a processor such as a central processing unit (CPU), a main storage device such as random access memory (RAM), and a secondary storage device such as read-only memory (ROM). CPU is an exemplary processor resource. In addition, RAM and ROM are exemplary memory-resources. The control unit 110 can execute arbitrary information processing based on various programs and various data. However, some or all of the functions of the control unit 110 may be realized by a hardware-circuit such as a ASIC, FPGA.

The storage unit 120 (storage medium) is constituted by any storage device such as a RAM, ROM or a flash memory. The storage unit 120 may include a removable medium (portable recording medium). Here, the removable medium may be, for example, a USB memory or a SD card. The storage unit 120 stores programs to be executed by the control unit 110 and various types of data to be used for executing the programs.

In the storage unit 120, a safety check point database (safety check point DB) 121 and a schedule database (schedule DB) 122 are constructed. The safety check point DB 121 stores information regarding a safety check point that is a geographical point (or area) for prompting the first user to take a safety action. Safety check points may include, for example, intersections, pedestrian crossings, railroad crossings, and parking lots. In addition, the safety check point may be set based on past accident information or disaster information. Further, on the basis of the travel data collected from each vehicle traveling on the road, a point at which many vehicles exhibit a specific behavior (for example, ignoring pause, sudden braking, etc.) may be set as the safety check point. In addition, the system 1 may be configured such that the second user can additionally register a new safety check point in the safety check point DB 121 using the second user terminal 300. The schedule DB 122 stores information about a time period in which the notification device 100 is to execute the power saving mode. The details of the power saving mode will be described later.

The battery 130 provides power to the notification device 100. A global positioning system (GPS) receiver 140 obtains a current position of the notification device 100. The motion sensor 150 is a sensor that detects the behavior of the notification device 100 (the behavior of the first user). Specifically, the motion sensor 150 includes sensors such as an angular velocity sensor, an acceleration sensor, and a geomagnetic sensor. The speaker 160 transmits a voice that is a reminding notification. The display 170 displays the status of the notification device 100. In addition, the display 170 may display the reminding notification as a character or an image. The display 170 may be a touch panel display that receives an input operation.

The data communication module 180 is a communication interface for connecting the notification device 100 to a network. For example, the data communication module 180 may be a wireless communication circuit for performing wireless communication according to a communication standard adopted in a network. The notification device 100 performs data communication with the management server 200 via the data communication module 180. The call module 190 is an interface for voice calls. The notification device 100 performs a call with the second user terminal 300 via the call module 190.

The management server 200 is a computer including a control unit, a storage unit, and a data communication module. The second user terminal 300 includes a control unit, a storage unit, a data communication module, and a call module.

Remind Notification Processing

Here, a process executed by the control unit 110 of the notification device 100 for transmitting a reminder notification will be described. In the notification device 100, GPS receiver 140 acquires the present position of the notification device 100 at a predetermined cycle. The present position of the notification device 100 acquired by GPS receiver 140 is inputted to the control unit 110. In addition, the safety check point DB 121 of the storage unit 120 stores information about a plurality of safety check points. Then, a reminding notification corresponding to the safety action to be urged to the first user is set for each safety check point.

The control unit 110 determines whether the present position of the notification device 100 inputted from GPS receiver 140 is located at one of a plurality of safety check points stored in the safety check point DB 121. When the current position of the notification device 100 is located at one of the plurality of safety check points, the control unit 110 transmits a reminder notification corresponding to the one safety check point via the speaker 160. In this case, the fact that the current position of the notification device 100 is located at one of the plurality of safety check points corresponds to the "transmission condition" according to the present disclosure.

In addition, the control unit 110 may determine whether to transmit the reminder notification by referring to not only the position of the notification device 100 but also the behavior of the notification device 100. Specifically, the detection value of the motion sensor 150 indicating the behavior of the notification device 100 is input to the control unit 110. Then, when the current position of the notification device 100 is located at a specific safety check point, the control unit 110 determines whether the first user is taking an action to urge the safety action based on the detection value of the motion sensor 150. At this time, when it is determined that the first user has taken an action to urge the safety action, the control unit 110 transmits a reminder notification corresponding to the action taken by the first user via the speaker 160. Thus, for example, when it is determined that the first user is running at the safety check point where the traffic volume of the vehicle is large, a sound "dangerous if running" is transmitted from the speaker 160 as a reminder notification. In this case, it is also included in the "transmission condition" according to the present disclosure that the first user takes an action to urge the safety action.

Control Mode

Next, a control mode of the notification device 100 will be described. The notification device 100 includes a first mode, a second mode, and a third mode as control modes. The control unit 110 switches these control modes. The first mode is a mode in which the above-described reminding notification processing is executed. Further, in the first mode, the current position (the current position of the first user) of the notification device 100 acquired by GPS receiver 140 is transmitted to the management server 200 via the data communication module 180 at a predetermined first cycle. In response to a request from the second user, the management server 200 transmits position information indicating the position of the first user received from the notification device 100 to the second user terminal 300. Therefore, the first mode is executed by the control unit 110. Thus, the second user can grasp the position of the first user in the first cycle, and can transmit the reminder notification from the notification device 100 when the safety action is to be urged to the first user.

However, the watching of the first user is not always necessary. For example, if the first user is in a relatively secure location, such as a school, the need to grasp the location of the first user and send reminder notifications to the first user is low. In such a case, the second mode or the third mode may be selected as the power saving mode in order to suppress power consumption in the notification device 100.

FIG. 3 is a diagram illustrating the states of the respective functions of the notification device 100 in the respective control modes. Here, each function of the notification device 100 is listed in the uppermost row of FIG. 3. The data communication function is a function of transmitting data to the management server 200 via the data communication module 180. The position information transmitting function is a function of acquiring the present position of the notification device 100 by GPS receiver 140 and transmitting the position information to the management server 200. The reminding calculation function is a function for executing a calculation for determining whether to send a reminding notification to the first user in the reminding notification processing. The voice transmission function is a function of transmitting a reminder notification via the speaker 160. The walking detection calculation function is a function of executing a calculation for detecting that the first user is walking by using a detection value of the motion sensor 150. The call function is a function of making a call with the second user terminal 300 via the call module 190.

The respective functions illustrated in FIG. 3 are switched between ON and OFF by the control unit 110. The control unit 110 realizes the respective control modes by switching ON and OFF of the respective functions. Here, in the first mode, all of the various functions illustrated in FIG. 3 are turned ON. At this time, the transmission of the position information to the management server 200 is executed in the first cycle as described above. In addition, the reminder notification process is executed by turning ON the reminder calculation function and the sound transmission function. In the first mode, the first user and the second user can make a call by turning ON the call function.

On the other hand, in the third mode, all of the various functions illustrated in FIG. 3 are turned OFF. Therefore, in the third mode, neither the transmission of the position information to the management server 200 nor the reminding notification processing is executed. Further, the first user and the second user cannot make a call using the notification device 100 and the second user terminal 300.

In the third mode, power dissipation in the notification device 100 can be suppressed by turning OFF various functions as described above. However, even in a situation where it is not necessary to prompt the first user to perform the safety action by the reminding notification process, the second user may want to grasp the position of the first user. However, even in such a case, it is considered that the necessity of the second user to grasp the position of the first user is reduced as compared with the case where it is necessary to urge the first user to perform the safety action. Therefore, in the second mode, the data communication function and the position information transmitting function are turned ON and the other functions are turned OFF among the various functions illustrated in FIG. 3. At this time, the transmission of the position information to the management server 200 is executed in a predetermined second cycle longer than the first cycle, which is the data transmission cycle in the first mode. As described above, in the second mode, the transmission period of the position information is set longer than the transmission period in the first mode, and the reminding notification processing is not performed. Therefore, even in the second mode, it is possible to suppress power consumption in the notification device 100 as compared with the first mode.

Here, the second user can set the schedule of the control mode of the notification device 100 using the second user terminal 300. Specifically, the second user inputs, to the second user terminal 300, a time period in which the second mode and/or the third mode, which is the power saving mode, is to be executed. Then, the information on the time zone input to the second user terminal 300 is transmitted to the notification device 100 via the management server 200. In the notification device 100, when the information on the second mode and/or the time zone in which the third mode is to be executed is received from the management server 200, the control unit 110 stores the information in the schedule DB 122. Accordingly, the second user can set the schedule of the control mode of the notification device 100 in accordance with the action schedule of the first user.

Figure 4:
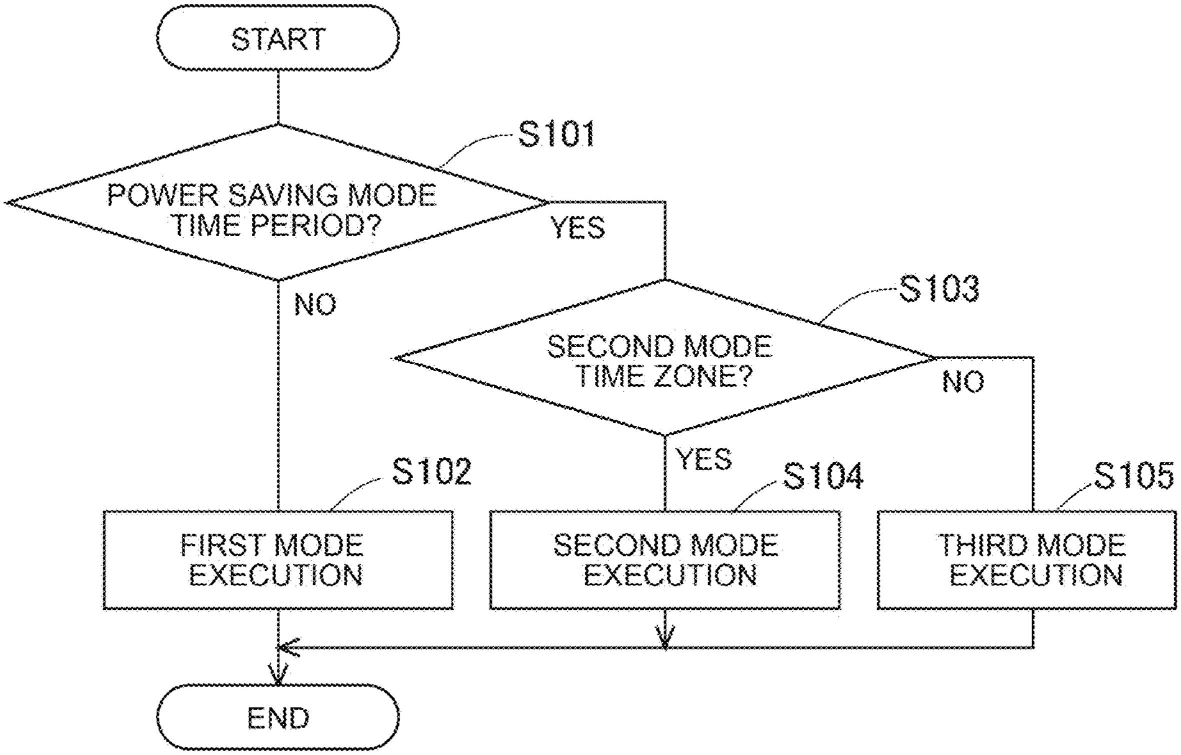
FIG. 4 is a flowchart illustrating a flow of a control mode selection process in the notification device.

Then, in the notification device 100, the control unit 110 selects and executes the control mode based on the schedule stored in the schedule DB 122. FIG. 4 is a flowchart illustrating a flow of a control mode selection process in the notification device 100. This flow is executed by the control unit 110 at a predetermined cycle.

In this process, first, in S101, it is determined whether the present time-zone in which the power-saving mode should be executed is the time-zone. Specifically, it is determined whether the present time is within a time period in which the second mode is to be executed or a time period in which the third mode is to be executed, which is currently stored in the schedule DB 122. At this time, if the time period in which the second mode is to be executed and the time period in which the third mode is to be executed are not stored in the schedule DB 122, a negative determination is made in S101. Further, even if a time period in which the second mode is to be executed and/or a time period in which the third mode is to be executed are stored in the schedule DB 122, if the present time is not within these time periods, a negative determination is made by S101. When a negative determination is made in S101, it can be determined that the power saving mode is not required to be executed. Then, S102 process is executed next. In S102, the first mode is executed as the control mode.

On the other hand, if an affirmative determination is made on S101, S103 process is executed next. In S103, it is determined whether the present time zone is a time zone in which the second mode is to be executed. At this time, if the time period in which the second mode is to be executed is stored in the schedule DB 122 and the present time period is within the time period, an affirmative determination is made by S103. Then, S104 process is executed next. In S104, the second mode is executed as the control mode.

On the other hand, if the schedule DB 122 does not include a time zone in which the second mode is to be executed, a negative determination is made by S103. Further, even if the time period in which the second mode is to be executed is stored in the schedule DB 122, if the present time period is not within the time period, a negative determination is made by S103. If a negative determination is made in S103, it can be determined that the present time is within a time period in which the third mode is to be executed. Then, the process in S105 is executed next. In S105, the third mode is executed as the control mode.

According to the above, each control mode can be executed by the notification device 100 on the schedule set by the second user.

Release Control of Second Mode

Next, release control of the second mode will be described. The second user may set a time period during which the first user spends in a school or a specific facility as a time period during which the second mode is to be executed. This is because it is considered that there is no need to prompt the first user for a safety action in the school or in a specific facility. The notification device 100 may then be placed in place while the first user is spending in school or a particular facility. In this case, in other words, while the position of the notification device 100 is not moving from the predetermined position, it can be determined that the first user is present in the school or the specific facility.

However, the action schedule of the first user may be changed unexpectedly. For example, the first user's exit time from school or a particular facility may be earlier than scheduled. In this case, on the assumption that the first user is a time zone spent in a school or a specific facility, the first user moves from the school or the specific facility even though the time zone is set as a time zone in which the second mode is to be executed. In such a case, the first mode is preferably executed at a timing when the first user moves from a school or a specific facility.

Figure 5:
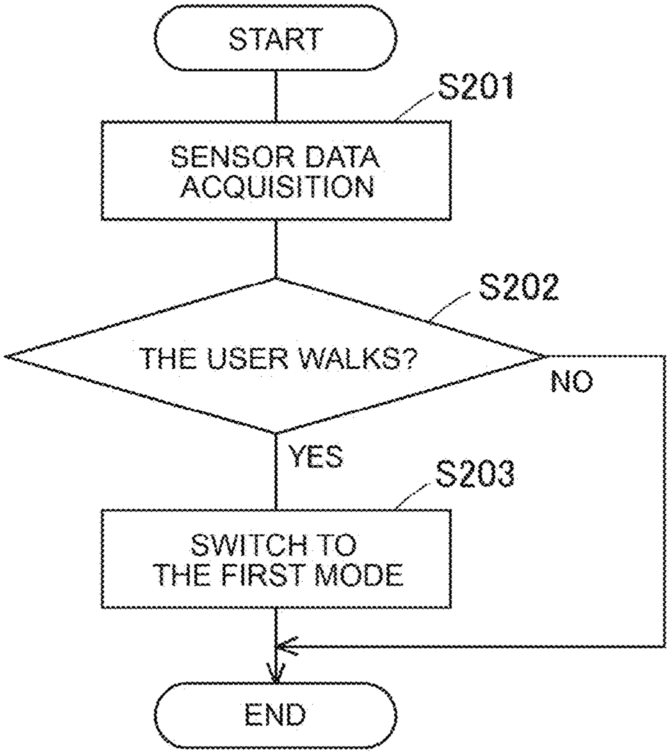
FIG. 5 is a flow chart showing a flow of release control in the second mode.

Therefore, in the notification device 100, when the above-described case occurs, the release control of the second mode is executed in order to switch the control mode from the second mode to the first mode. FIG. 5 is a flowchart illustrating a flow of release control in the second mode. This flow is executed by the control unit 110 at a predetermined cycle when the second mode is executed in the notification device 100.

In this process, first, in S201, the detected value of the motion sensor 150 is acquired. Next, in S202, it is determined whether the first user is walking based on the detected value of the motion sensor 150 acquired by S201.

As discussed above, the notification device 100 is placed in place while the first user is spending in school or a particular facility. Therefore, the detection value indicating the walking of the first user is not detected by the motion sensor 150 during this period. Therefore, when a detection value indicating walking of the first user is detected from the motion sensor 150, the first user moves the notification device 100 from the predetermined position. That is, it can be determined that the first user is about to move from a school or a specific facility.

Therefore, if a negative determination is made in S202, the process is terminated. In this case, in the notification device 100, the second mode is continuously executed. On the other hand, if an affirmative determination is made in S202, S203 process is executed next. Note that, in S202, an affirmative determination may be made when the detected value of the motion sensor 150 indicates that the first user is walking for a predetermined time or longer. In S203, in the notification device 100, the second mode is released and the control mode is switched to the first mode.

According to the above-described flow, when the first user attempts to move from the school or the particular facility within the time period in which the second mode stored in the schedule DB 122 is to be executed, the notification device 100 may switch the control mode from the second mode to the first mode.

In a case where a detection value indicating walking of the first user is not detected from the motion sensor 150 for a predetermined period after the second mode is released by the second mode release control, it is highly likely that the movement of the first user from the school or the specific facility is not actually performed. Therefore, in such a case, the control unit 110 may return the control mode of the notification device 100 from the first mode to the second mode.

Call Disable Notification

Next, call disable notification control executed in the second user terminal 300 will be described. As described above, in the notification device 100, when the second mode or the third mode, which is the power saving mode, is being executed as the control mode, the call function is turned OFF. However, even in a time period in which the power saving mode is executed in the notification device 100, the second user may attempt to talk to the first user using the second user terminal 300. Therefore, in the present embodiment, in such a case, the second user terminal 300 executes the call disable notification control for notifying the second user that a call with the notification device 100 (a call with the first user) is disabled.

Figure 6:
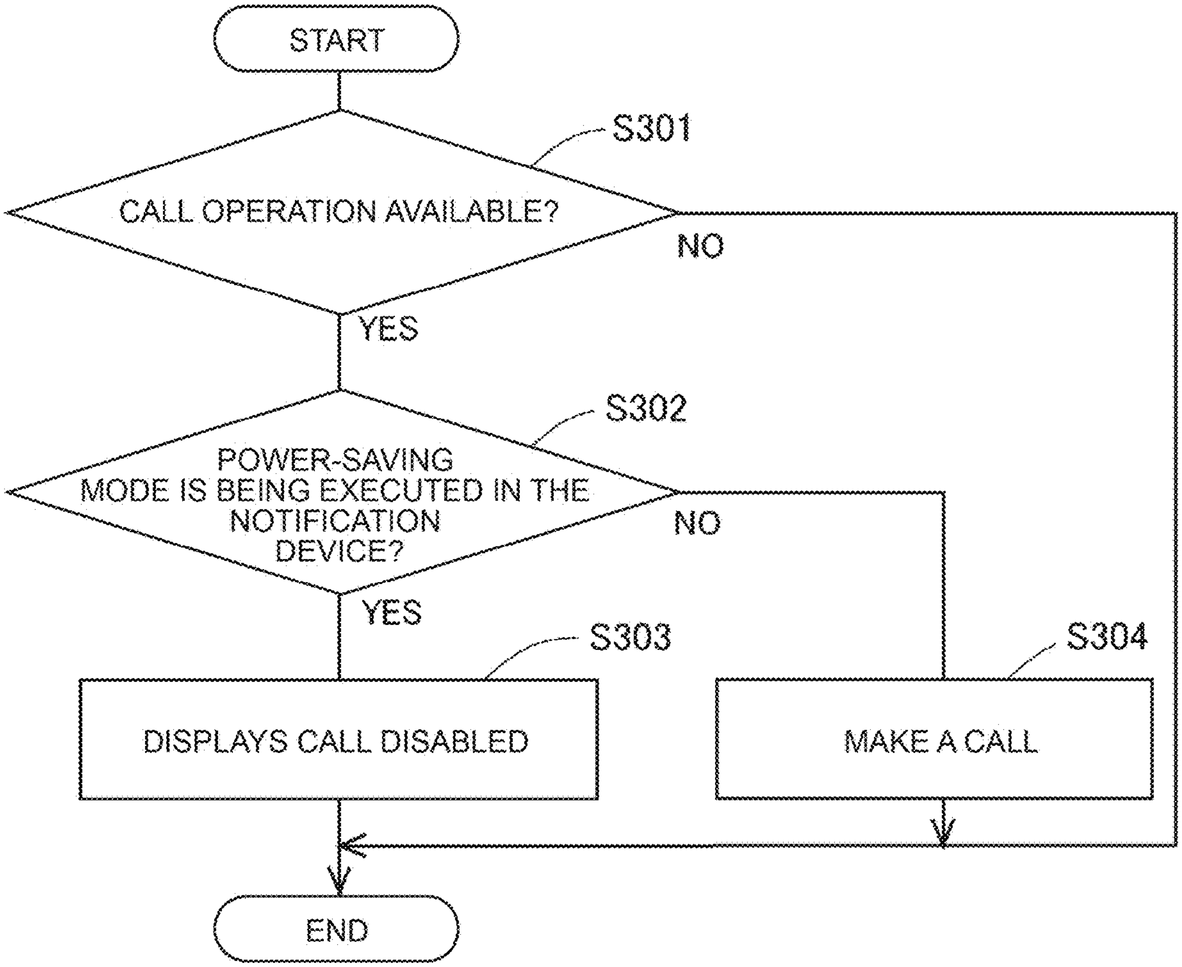
FIG. 6 is a flowchart illustrating a flow of call disable notification control.

FIG. 6 is a flowchart illustrating a flow of call disable notification control. This flow is executed by the control unit of the second user terminal 300 when a call operation is performed on the second user terminal 300. In this process, first, in S301, it is determined whether a call manipulation for making a call with the notification device 100 has been performed on the second user terminal 300. If a negative determination is made in S301, the process is terminated once.

On the other hand, if an affirmative determination is made on S301, S302 process is executed next. In S302, the notification device 100 determines whether the power saving mode is currently being executed. Here, as described above, when the second user sets the schedule of the control mode of the notification device 100, a time period in which the second mode is to be executed and/or a time period in which the third mode is to be executed are input to the second user terminal 300. The input information at this time is also stored in the storage unit of the second user terminal 300. Therefore, in S302, it may be determined whether the notification device 100 is currently executing the power saving mode on the basis of a time period in which the second mode inputted in advance to the second user terminal 300 is to be executed and/or a time period in which the third mode is to be executed for scheduling the control mode of the notification device 100. In addition, information on the control mode currently being executed may be received from the notification device 100 via the management server 200.

When a negative determination is made in S302, that is, when the first mode is executed in the notification device 100, S304 process is executed next. In S304, a call is transmitted to the notification device 100. On the other hand, when an affirmative determination is made in S302, that is, when the second mode or the third mode is executed in the notification device 100, S303 process is executed next. In S303, the second user terminal 300 displays that the communication with the notification device 100 is not currently possible.

According to the above-described flow, when the second user attempts to make a call with the first user using the second user terminal 300 during the time period in which the call is disabled, the second user terminal 300 can notify the second user of the call disabled.

Modified Examples

In the above-described system 1, the control unit 110 of the notification device 100 executes an operation for determining whether the reminding notification should be sent to the first user in the reminding notification process. However, the operation may be executed by the management server 200. In this case, the position information of the notification device 100 and the detection value of the motion sensor 150 are transmitted from the notification device 100 to the management server 200. Further, as a result of the calculation performed by the management server 200, when it is determined that the reminding notification should be transmitted to the first user, a reminding notification transmission command is transmitted from the management server 200 to the notification device 100. When the notification device 100 receives a transmission command from the management server 200, the control unit 110 transmits a reminder notification via the speaker 160.

The notification device 100 and the second user terminal 300 may have a chat function. In this case, in the notification device 100, the chatting function may be turned ON in the first mode and turned OFF in the second mode and the third mode, which are the power saving modes, similarly to the call function.

Other Embodiments

The above-described embodiments are merely examples, and the present disclosure may be appropriately modified and implemented without departing from the scope thereof. For example, the processes and means described in the present disclosure can be free combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read-only memory (ROM), a random access memory (RAM), an erasable programmable read-only memory (EPROM), an electrically erasable programmable read-only memory (EEPROM), a magnetic card, a flash memory, or any type of medium suitable for storing electronic commands such as an optical card.

What is claimed is:

1. A notification device that is carried by a user, comprising a processor configured to:

transmit position information to a predetermined external device, the position information indicating a position of the notification device;

output a notification prompting the user to take a safety action; and switch a control mode between a first mode and a second mode, wherein:

in which in the first mode, the position information is transmitted to the predetermined external device in a first predetermined interval, and the notification is output in a case where a condition for outputting the notification is met;

in the second mode, the position information is transmitted to the predetermined external device in a second predetermined interval, and the notification is not outputted, the second predetermined interval being longer than the first predetermined interval; and the condition includes that the position information indicates that the notification device is located at a predetermined safety check point.

2. The notification device according to claim 1, wherein the processor is configured to:

determine whether the condition is met based on at least the position information; and stop determining whether the condition is met in a case where the control mode is in the second mode.

3. The notification device according to claim 1, wherein the processor is configured to switch the control mode to the second mode in a predetermined time period in a schedule.

4. The notification device according to claim 1, wherein the processor is configured to switch the control mode from the second mode to the first mode in a case where the user carrying the notification device is detected as walking in a case where the control mode is in the second mode.

5. The notification device according to claim 1, wherein the condition includes that sensor information indicates that the user is performing a predetermined action at the predetermined safety check point.

6. The notification device according to claim 1, wherein the notification device is configured to store information on a plurality of safety check points, and the plurality of safety check points includes intersections, pedestrian crossings, railroad crossings, and parking lots.

* * * * *